(12) United States Patent
Shuster

(10) Patent No.: US 8,672,477 B2
(45) Date of Patent: *Mar. 18, 2014

(54) EYEWEAR WITH PINHOLE APERTURE AND LENS

(76) Inventor: Gary Stephen Shuster, Fresno, CA (US)

(*) Notice: Subject to any disclaimer, the term of this patent is extended or adjusted under 35 U.S.C. 154(b) by 156 days.

This patent is subject to a terminal disclaimer.

(21) Appl. No.: 13/189,817

(22) Filed: Jul. 25, 2011

(65) Prior Publication Data

US 2011/0279768 A1 Nov. 17, 2011

Related U.S. Application Data

(63) Continuation of application No. 13/073,156, filed on Mar. 28, 2011, now Pat. No. 7,984,987, which is a continuation of application No. 11/743,380, filed on May 2, 2007, now Pat. No. 7,914,144.

(51) Int. Cl.
*G02C 7/00* (2006.01)
*G02C 7/02* (2006.01)

(52) U.S. Cl.
USPC .................. 351/159.52; 351/159.01

(58) Field of Classification Search
USPC ............ 351/159.01, 159.52, 159.72, 159.78
See application file for complete search history.

(56) References Cited

U.S. PATENT DOCUMENTS

| 1,340,579 | A | 5/1920 | Tousey |
| 1,959,915 | A | 5/1934 | Gunthrie |
| 2,390,599 | A | 12/1945 | Lewis |
| 3,423,149 | A | 1/1969 | Braunhut |
| 3,507,566 | A | 4/1970 | Knapp |
| 3,555,563 | A | 1/1971 | Grossman |
| 4,012,129 | A | 3/1977 | Byler |
| 4,249,803 | A | 2/1981 | Byler |
| 5,140,710 | A | 8/1992 | Rademacher |
| 5,151,720 | A | 9/1992 | Kanbar |
| 5,444,501 | A * | 8/1995 | Aloi et al. ........................ 351/44 |
| 5,485,227 | A * | 1/1996 | Lin ................................ 351/46 |
| 5,638,145 | A | 6/1997 | Jannard et al. |
| 5,748,279 | A | 5/1998 | Glanzbergh |
| 5,825,452 | A | 10/1998 | Spector |
| 6,050,684 | A | 4/2000 | Mage |
| 6,450,639 | B1 | 9/2002 | Abraham |
| 6,758,562 | B1 | 7/2004 | Barnette et al. |
| 6,783,235 | B1 | 8/2004 | Lin |
| 6,899,427 | B1 | 5/2005 | Sheldon |
| 2001/0050750 | A1 | 12/2001 | Breger |
| 2003/0081169 | A1 | 5/2003 | Kopler |
| 2004/0119936 | A1 | 6/2004 | Min |
| 2004/0263773 | A1 | 12/2004 | Lane et al. |
| 2005/0036109 | A1 | 2/2005 | Blum et al. |

OTHER PUBLICATIONS

Boutet, C., Pinhole Camera, www.crickmengual.com, pp. 1-33.

(Continued)

*Primary Examiner* — James Greece
(74) *Attorney, Agent, or Firm* — Novak Druce Connolly Bove + Quigg LLP; Jonathan Jaech

(57) ABSTRACT

Eyewear is equipped with at least one lens and at least one pinhole aperture. Lenses and apertures may be used in place of or in combination with one another, and may be disposed in or on full frame, half frame, wire frame or rimless eyeglasses. The lens may be a corrective lens. Pinhole apertures may have a diameter no greater than about 3 mm, and a diameter/thickness ratio no less than about 66.7%.

20 Claims, 5 Drawing Sheets

(56) References Cited

OTHER PUBLICATIONS

Pinhole Optics, Vanderbilt Student Volunteers for Science, Vanderbilt. edu/vsvs Fall 2005, pp. 1-6.
Pinhole Glasses by Caribbean Eyes,PinholeGlasses.org, pp. 1-3.
Pinhole Glasses, www.myopia.org, pp. 1-5.
Eyeglass Frames, Eyecare Library, VisionRX LLC, 2005, pp. 1-4.
Experiment VII, Geometrical Optics—Optical Instruments, Princeton University, Physics Department, Physics104 Lab, Week #9, pp. 1-18.
Pinhole Imaging, Geometric Optics, Physics 1b, 2006, pp. 1-8.

\* cited by examiner

EYEWEAR WITH PINHOLE APERTURE AND LENS

CROSS REFERENCE TO RELATED APPLICATION

This application is a continuation of application Ser. No. 13/073,156 filed Mar. 28, 2008, now U.S. Pat. No. 7,984,987, which is a continuation of application Ser. No. 11/743,380 filed May 2, 2007, now U.S. Pat. No. 7,914,144, which applications are specifically incorporated herein, in their entirety, by reference.

BACKGROUND OF THE INVENTION

1. Field of the Invention

The present invention relates to eyewear, and more particularly, to corrective eyewear that provides the option of using a lens or a pinhole aperture disposed adjacent to the lens.

2. Description of Related Art

There are a number of conditions of the eye that affect one's visual acuity over a range of distances. Myopia ("nearsightedness") refers generally to a condition in which distant objects appear blurred. It is often caused by an elongated eyeball which causes light to focus in front of the retina instead of directly on it. On the other hand, hyperopia ("farsightedness") refers to the opposite condition, in which nearby objects appear blurred. As one might guess, hyperopia is caused by a shortened eyeball which causes light to focus behind the retina instead of directly on it.

Those who are fortunate enough to have avoided developing myopia or hyperopia, however, will inevitably develop presbyopia. Presbyopia is a vision condition in which the crystalline lens of the eye loses its flexibility, making it difficult to focus on close objects. Presbyopia usually becomes noticeable in the early to mid-40s and is a natural part of the aging process of the eye. It is not a disease, and it cannot be prevented. Thus, the need for corrective eyewear will be inevitable for most people.

The most common types of corrective eyewear are corrective lenses, such as glasses or contact lenses. Corrective lenses may be worn to correct most refraction errors of the eyes. Single vision lenses have the same optical correction over the entire area of the lens and are therefore suitable for those who suffer from a single refractive error. Many people, however, may suffer from more than one refractive error. For example, a person may have various combinations of myopia, hyperopia, presbyopia, or astigmatism. In such cases, bifocals, trifocals, or progressive lenses may be necessary.

Bifocals and trifocals are eyeglasses in which the lenses have two and three distinct regions of different optical powers, respectively. Bifocals are most commonly prescribed to people with presbyopia who also require correction for myopia, hyperopia, and/or astigmatism. Trifocals similar to bifocals, with the exception that trifocals have an additional segment for intermediate vision above the reading section and below the distance section. Trifocals are becoming rarer as more and more people are choosing to wear progressive lenses. Progressive lenses provide a gradient of increasing lens power, from minimal or no magnification at the top of the lens to maximum magnification at the bottom of the lens. A wearer can view objects at different viewing distances by directing his line of sight through appropriate parts of the lens.

Although corrective lenses have been developed to correct a variety of refractive errors, they are still limited to correcting predefined refractive errors in a person's eyes. Thus, once prescribed and cut, corrective lenses are not adjustable to further other changes in a person's vision. An additional eye examination will be necessary to address these changes in the person's vision. What is needed therefore is an optical device which, in addition to corrective lenses, can easily provide yet another way for improving one's visual acuity over a range of distances.

SUMMARY

The present invention provides for an optical device which includes at least two mechanisms for improving or enhancing one's visual acuity. The first mechanism is provided by one or more corrective lenses, which improve visual acuity by bending light in a way that causes it to be focused directly onto the retina. The second mechanism is provided by pinhole apertures, which improve visual acuity by reducing the width of the bundle of light rays entering the pupil of the eye. Pinhole apertures produce a sharper image on the retina by reducing the amount of peripheral light rays that enter into the eye. It is the peripheral light rays which require the most bending to produced a focused image and which are primarily responsible for blurred vision. A pinhole aperture may also be used to project a magnified image on the retina, and thereby allow viewing of smaller objects such as small type, than would otherwise be possible.

In one embodiment, an optical device is provided. The optical device comprises a first vision element comprising at least one corrective lens and a second vision element comprising at least one aperture coupled to the first vision element. The first and second vision element may each at least partially reduces a refraction error of a user's eye when either or both are positioned in front of the user's eye. The at least one aperture is characterized by a diameter and thickness (determined by the thickness of the material that the aperture pierces), wherein the thickness is no greater than the diameter. In the alternative, the corrective lens may be replaced by a non-refractive lens, for example a shaded lens as used in sunglasses.

In another embodiment, a dual corrective eyewear is provided. The dual corrective eyewear comprises at least one lens; a frame supporting the lens; and at least one pinhole aperture disposed in the frame. The lens is configured to at least partially reduce a refraction error in a wearer's eyes by bending some of the light rays entering through the corrective lens and into the wearer's eye. The pinhole aperture is configured to at least partially reduce the refraction error in a wearer's eye by blocking some of the light rays from entering into the wearer's eye, to project a magnified image onto the user's retina, or both.

There are certain disadvantages associated with the use of corrective lenses. Corrective lenses often produce glare and distortion. For example, multi-focal lenses, which are designed to provide a continuously variable curve for a range of distances, often provide distorted images on either side of the center line, which may be uncomfortable or difficult to get used to. Another disadvantage is that corrective lenses are limited to correcting a predefined refractive error and do not adapt to respond to changes in the visual acuity of the eye.

Apertures, or pinhole apertures, on the other hand, are not associated with many of the problems inherent in corrective lenses. For example, apertures may provide an improved image at all distances, or over a greater range of distances, because they operate differently from corrective lenses. Apertures reduce the width of the bundle of diverging rays coming into a person's eye from each point on the viewed object. Normally, the full opening of the pupil admits light and it is the improper bending of the outermost peripheral light rays which causes refractive errors such as myopia, hyperopia, presbyopia and astigmatism to be noticeable. Apertures can therefore provide clearer vision in all of these conditions by blocking these peripheral rays and only letting into the eye those rays which pass through the central portion of the pupil. An aperture may also be used to produce a magnified or reduced image by varying the focal length, as applied in pinhole cameras, camera obscuras, or the like.

As used herein, "apertures" or "pinhole apertures" are used to describe holes through which a person's line of sight may be directed and that function to reduce the bundle of light rays entering into the person's eye to produce a clearer or a magnified image. Apertures or pinhole apertures are characterized by shape having a diameter and a thickness. The apertures or pinhole apertures may be of any suitable shape, such as a circle, ellipse, triangle, square, rectangle, or other polygon, so long as it is configured to at least partially block some of the peripheral light rays from entering into the person's eye. Regularly-shaped apertures may be more useful than irregularly-shaped apertures.

The diameter (d) of the aperture or pinhole apertures is defined as the largest distance that can be formed between two opposite points in the aperture. The diameter (d) should preferably be no greater than about 3 mm, preferably no greater than 2 mm, and more preferably no greater than 1 mm. In one aspect of the invention, the apertures or pinhole apertures have a diameter ranging from about 0.3 mm to about 2 mm, preferably about 0.5 mm to about 1.5 mm, and more preferably from about 0.8 mm to about 1.2 mm.

The thickness (t) of the aperture or pinhole aperture is the straight-line distance measured therethrough. The thickness (t) should preferably be no greater than the diameter (d) of the aperture or pinhole aperture. In one aspect, the ratio of the aperture diameter to thickness (d:t) should be no less than about 1:1.5, preferably greater than 1:1, and more preferably greater than 2:1. Generally, the thinner the aperture, the better the visual acuity and light provided by the aperture to the eye.

A plurality of apertures or pinhole apertures having a range of different diameters or thicknesses or both may be provided for viewing objects at various distances. The smaller openings may be used for viewing objects which are nearby, whereas the larger openings may be used for viewing distant objects. By providing a plurality of apertures of graduated sizes, the user can adjust the level of visual acuity obtained by selecting the appropriately sized aperture that provides an optically focused object. For convenience, the graduated apertures may be provided adjacent to one another through a common substrate. For example, apertures of different sizes may be arranged around a correcting lens of an a pair of eyeglasses, through the eyeglasses frame.

Despite the advantages provided by apertures, however, there are still situations in which use of corrective lenses may be preferable to apertures. For example, because apertures reduce the amount of light entering into the eye, they may not be suitable for use at night or in conditions of poor or dim lighting. In some instances, the aperture size may be increased to permit more light to enter into the eye; however, larger apertures will result in a reduction in image sharpness or resolution. Thus, corrective lenses should be used in conditions of poor or inadequate lighting. Apertures also do not provide improved peripheral vision. Thus, the use of corrective lenses is recommended when engaging in activities involving movement, such as driving.

Thus a combination of corrective lenses and apertures may be used to provide improved visual acuity, not only over a range of distances but also over a range of conditions in which one or the other may be more suitable.

Other objects, features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

In the drawings and detailed description, like numerals refer to like parts throughout one or more of the drawings.

DETAILED DESCRIPTION

The present inventions provide for an optical device that provides pinhole apertures together with an eyeglass frame. In some embodiments, at least two different mechanisms for improving or enhancing one's visual acuity: one or more corrective lenses and one or more optical apertures. In other embodiments, the pinhole apertures may be provided in a frame that holds non-corrective lenses, such as shaded lenses for sun protection, or clear lenses for style. In still other embodiments, the apertures may be provided in an eyeglass frame that is configured to hold a corrective or non-corrective lens, but in which no lens has yet been inserted. In still other embodiments, pinhole apertures may be provided in a visor or other appliance that is configured to clip or attach to an eyeglass frame. Any or all of these embodiments may be preferred, depending on the various anticipated needs or desires of the end user.

Eyeglasses generally fall into three categories: full-rimmed, half-rimmed, wire-rimmed, and rimless. A full-rimmed eyeglass frame has a frame that completely encircles the lens. In a half-rimmed eyeglass frame, there is no frame on the bottom or top of the lens. In a wire-rimmed frame, the frame is constructed of a metal wire, which may be quite thin and lightweight. Rimless eyeglass frames generally have no frame around the lens and only a bridge connecting the lens pair and a pair of temples to support the lens on the user's face. The present invention may be provided in connection with any one of these eyeglass types.

Figure 1A:
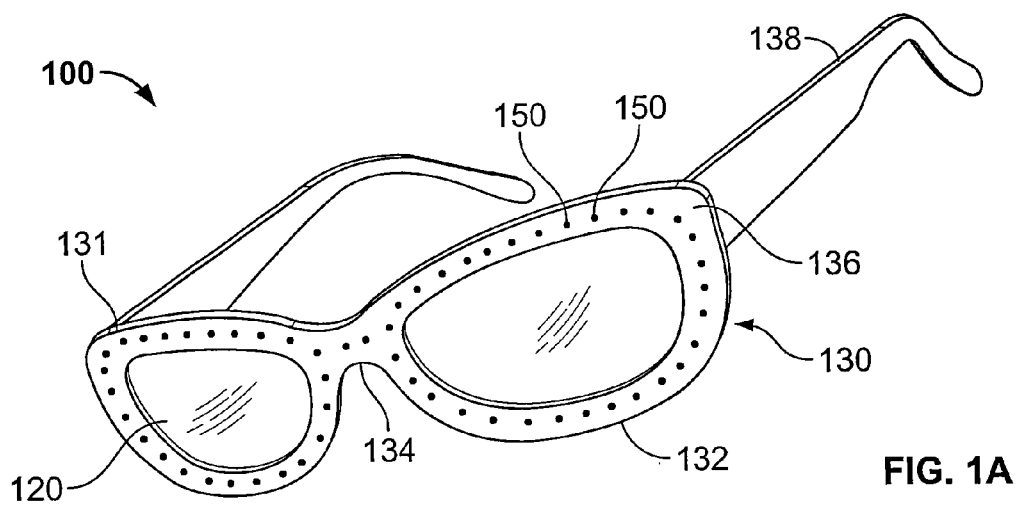
FIG. 1A is a perspective view of an exemplary corrective eyewear, illustrating the placement of the apertures in the frame front surrounding a lens.
Figure 1B:
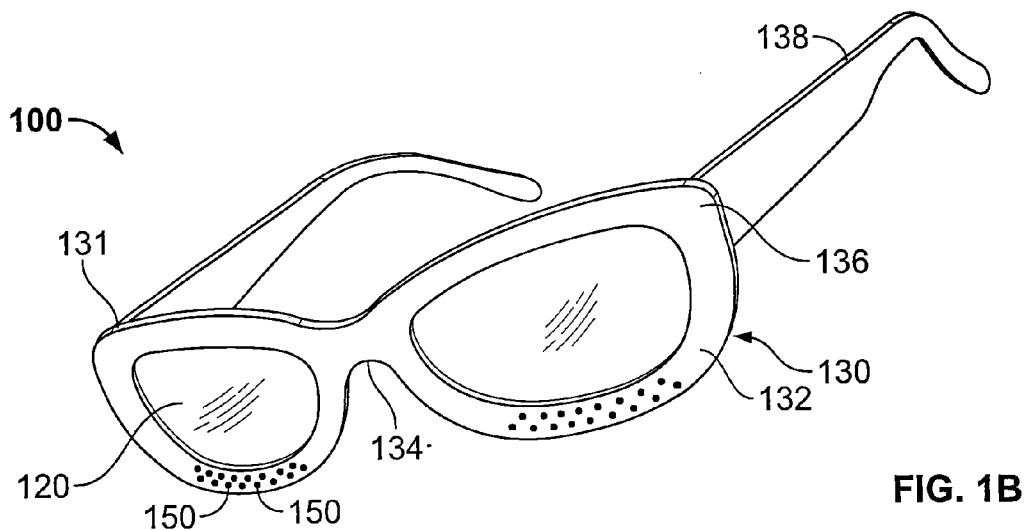
FIG. 1B is a perspective view of an exemplary corrective eyewear, illustrating the placement of the apertures at the bottom end of the frame front.
Figure 1C:
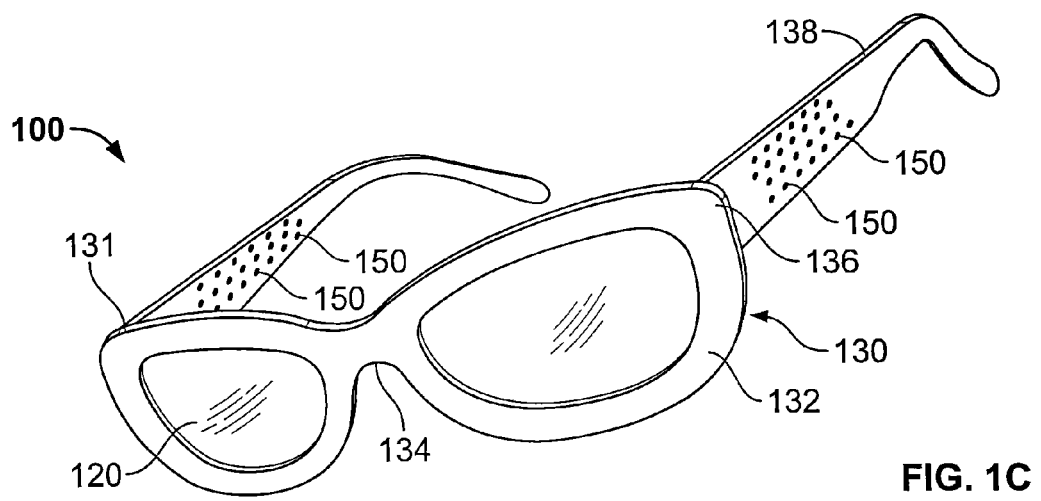
FIG. 1C is a perspective view of another exemplary corrective eyewear, illustrating the placement of the apertures in the frame temples.

FIGS. 1A-C show perspective views of various embodiments of full-rimmed frames with pinhole apertures. In FIGS. 1A-C, eyeglasses (100) comprise generally a corrective lens (120) that is supported in a frame (130). The frame (130) further comprises the frame front (132) surrounding the corrective lens (120), a bridge (134) to connect the two corrective lens (120), an end piece (136), and a pair of temples (138) connected to the end piece (136) by a hinge (131). The frame (130) may be constructed from any suitable material known in the art, such as plastic, metal, metal alloy, and composites. Preferably, the area of the frame front (132) comprising the apertures (150) should preferably be opaque and be constructed of relatively thin material so as to reduce the resulting thickness (t) of the apertures (150). Additionally, this area should preferably be substantially opaque. For example, for an aperture diameter in the range of about 0.8-1.2 mm, the frame should be less than 2 mm thick in the area where the aperture is placed, and more preferably, less than 1 mm thick. Where it is desired to maintain a thicker frame for structural or aesthetic reasons, the frame may be locally thinned in a surrounding area where the aperture is placed.

Referring now to the specific embodiments, FIG. 1A illustrates a full-rimmed eyeglass (100) having a plurality of pinhole apertures (150) disposed in the frame front (132) surrounding the corrective lens (120) and in the bridge (134). Although the apertures (150) in FIG. 1A are depicted as forming a single line around the corrective lens (120), the apertures (150) may also be provided in multiple rows as can be accommodated by the width of the frame front (132). If multiple rows of apertures are provided in the frame front (132), the apertures (150) in one row may be staggered with respect to the other rows. The pinhole apertures (150) may be the same size and shape, or may be provided in different sizes and/or shapes, for example, in graduated sizes.

In this embodiment, the pinhole apertures and lens are not designed to be used simultaneously. By displacing the frame front (132) from its normal resting position in any radial direction, a user may align one of the pinhole apertures with one or both eyes. This may be useful, for example, to read small type than cannot be read using the corrective lens (120). Also, a clear or shaded non-corrective lens may be substituted for the corrective lens (120), with optical correction provided solely by the pinhole apertures. This may be useful to provide sunglasses or fashion eyewear with a universal corrective tool—the pinhole aperture—for sporadic reading or close inspection of small items.

FIG. 1B illustrates a full-rimmed eyeglass (100) in which a plurality of pinhole apertures (150) are provided at the bottom of the frame front (132). Although the plurality of pinhole apertures (150) is depicted as being disposed in the bottom of the frame front (132), it is understood that the pinhole apertures (150) may also be disposed in the top of the frame front (132).

With regard to FIGS. 1A and 1B, providing pinhole apertures (150) at the top or bottom parts of the frame front (132) allow ease of use for the wearer to peer through the pinhole apertures (150). If the pinhole apertures (150) are located in the top section of the frame front (132), the wearer may direct his eyesight through the apertures by tilting his head forward and directing his line of sight upwards towards the pinhole apertures. The wearer may also position the eyeglasses (100) lower on the nose to position the pinhole apertures (150) directly in front of the wearer's eyes. Similarly, if the pinhole apertures (150) are located in the bottom section of the frame front (132), the wearer may direct his eyesight through the apertures by tilting his head backward and directing his line of sight downward towards the pinhole apertures (150). The wearer may also lift the glasses (100) higher on the nose to place the pinhole apertures (150) directly in front of the wearer's eyes.

FIG. 1C shows another embodiment of the eyeglasses (100) in which the pinhole apertures (150) are disposed in the frame temples (138). The embodiment depicted in FIG. 1C differs from the embodiments depicted in FIGS. 1A and B in that the wearer must first remove and rotate the eyeglasses (100) to position the frame temples (138) having the pinhole apertures (150) in front of the wearer's eyes. Although the embodiment in FIG. 1C depict the pinhole apertures (150) on both frame temples (138), it is understood that the pinhole apertures (150) may be provided on only a single frame temple (138).

In embodiments where the pinhole apertures (150) are provided on both frame temples (138), a plurality of apertures (150) having a variety of diameters may be provided on the frame temples (138) allowing a greater range of visual acuity. The apertures (150) may be graduated in size, with the smaller apertures on the bottom and the larger apertures on top, or vice versa. The smaller openings may be used for viewing objects which are nearby, whereas the larger openings may be used for viewing distant objects. By providing a plurality of apertures of graduated sizes, the user can adjust the level of visual acuity obtained by selecting the appropriately sized aperture that provides an optically focused object. The plurality of apertures may be provided along an axis that is roughly perpendicular to the user's line of sight and may increase or decrease in diameter along that axis.

Figure 2A:
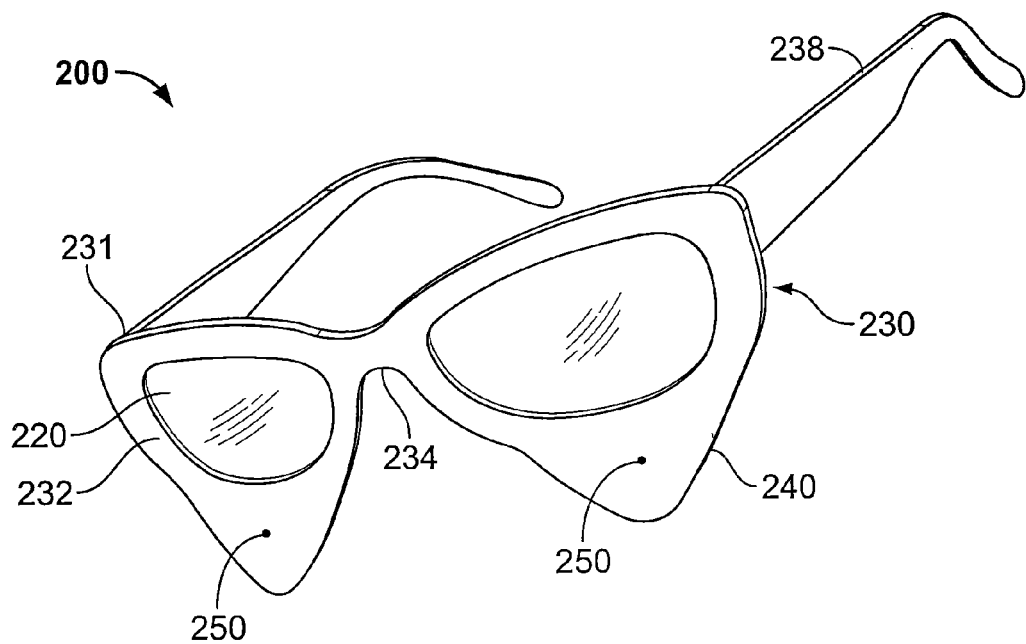
FIG. 2A is a perspective view of another exemplary corrective eyewear, illustrating the placement of the apertures in an elongated portion of the bottom frame front.
Figure 2B:
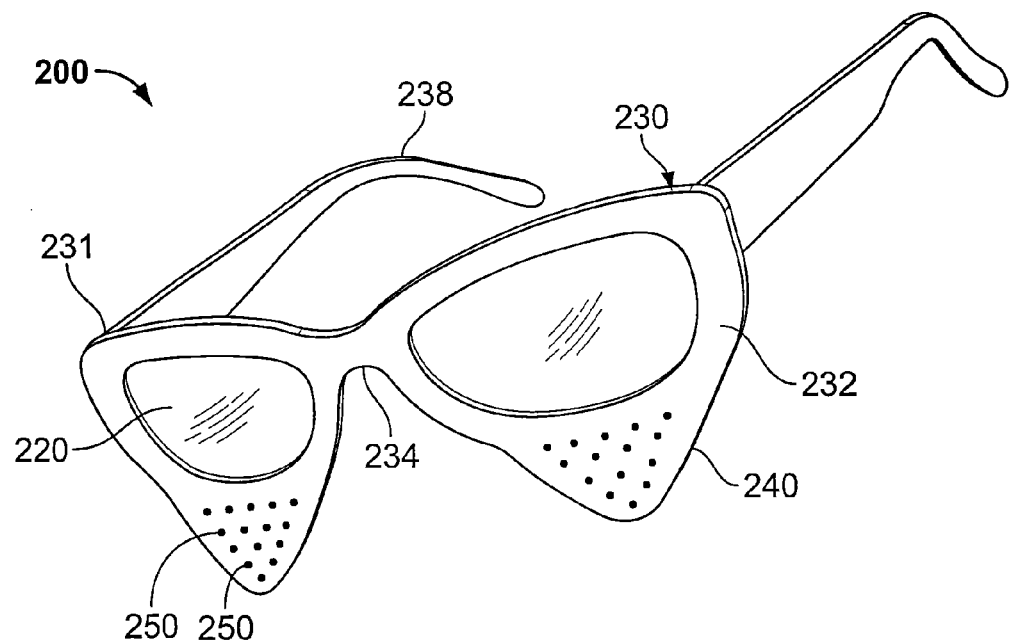
FIG. 2B is a perspective view of another exemplary corrective eyewear, illustrating the placement of the apertures in an elongated portion of the bottom frame front.

FIGS. 2A-B depict embodiments of the dual corrective eyewear (200) comprising corrective lens (220) and a frame (230). The frame (230) comprises a frame front (232), a bridge (234) and a pair of frame temples (238) that is connected to the frame front (232) by a hinge (231). The hinge (231) permits the folding of the frame temples (238) onto the frame front (232) for storage when the eyewear (200) is not in use. The frame front (232) further comprises a substantially opaque elongated bottom panel (240) which comprises pinhole apertures (240). The elongated bottom panel (240) preferably has a thickness that is no greater than the diameter of the pinhole apertures (240). In FIG. 2A, a single pinhole aperture (250) is provided for each eye on the bottom panel (240), whereas in FIG. 2B, a plurality of pinhole apertures (250) are provided for each eye on the bottom panel (240).

It is understood that the number of pinhole apertures is not critical. In one aspect of this embodiment, the pinhole apertures are staggered and graduated. In the embodiments depicted in FIG. 2B, because the pinhole apertures should optimally be positioned in front of the user's eyes and because the distance between the user's eyes may vary from person to person, providing a plurality of pinhole apertures may ensure that at least one pair of pinholes will be optimally positioned in front of the user's eyes. Also, providing a plurality of pinholes also allows more light to pass through.

Figure 3A:
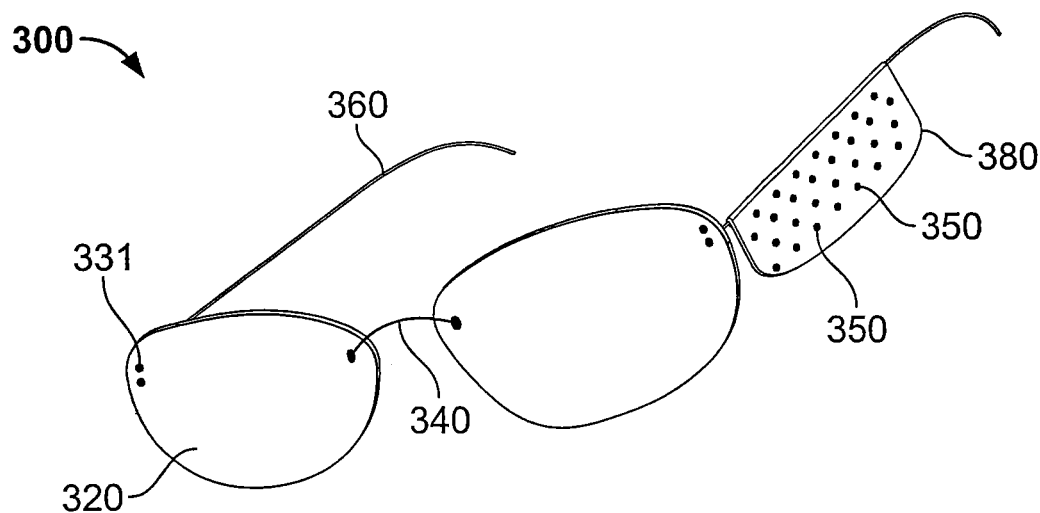
FIG. 3A is a perspective view of an exemplary rimless corrective eyewear, illustrating the placement of the apertures on an opaque plate attached to the frame temples.

FIG. 3A shows an embodiment of a wireframe or rimless dual corrective eyewear (300). In this embodiment, the eyewear (300) comprises a pair of corrective lens (320), a bridge (340) that connects the corrective lens (320), and a pair of temples (360) attached to the corrective lens (320). Because the eyewear (300) is rimless or framed using a thin wire, it does not have a frame into which pinhole apertures may be disposed. Accordingly, an opaque plate (380) comprising a plurality of pinhole apertures (350) may be provided on the temples (360). In one aspect of this embodiment, the opaque plate (380) may be removably attached to either or both of the temples (360) and may be constructed of thin material having a thickness no greater than 2 mm, preferably no greater than 1 mm, and more preferably no greater than 0.5 mm. In another aspect of this embodiment, the plate (380) may be integrally molded with the temples (360) and be constructed of a substantially opaque material.

Figure 3B:
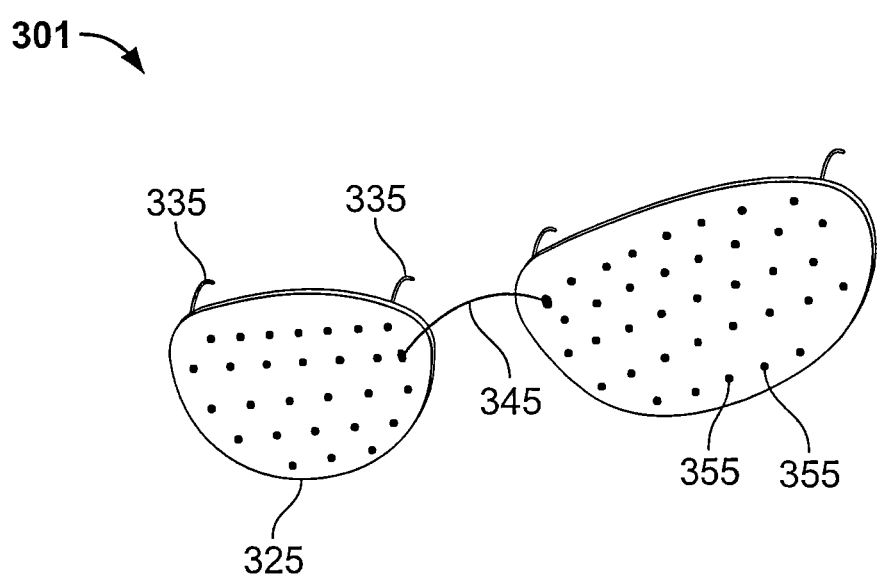
FIG. 3B is a perspective view of another exemplary rimless corrective eyewear, illustrating a clip on piece comprising a plurality of graduated apertures.

FIG. 3B depicts a pinhole attachment piece (301) which may be removably attached to the corrective lens (320) of the wireframe or rimless corrective eyewear of the type depicted in FIG. 3A. Because rimless eyewear and wireframe eyewear do not have as many structural parts onto which pinhole apertures may be provided, a separate pinhole attachment piece (301) may be provided. Thus, providing the pinhole attachment piece (301) obviates the need to provide the plate (380) depicted in FIG. 3A.

The pinhole attachment piece (301) comprises a pair of opaque lenses (325), a connector (345) that couples the opaque lenses (325) and hooks (335) disposed on the periphery of the opaque lenses (325). The hooks (335) are configured to couple the pinhole attachment piece (301) onto a pair of rimless or wireframe eyeglasses of the type depicted in FIG. 3A. The opaque lenses (325) each comprise a plurality of pinhole apertures (355). In the alternative, each opaque lenses may have only a single pinhole aperture located at or near the center of the lens to as to be more readily aligned with the wearer's eyes.

A significant advantage in providing a pinhole attachment piece (301) depicted in FIG. 3B in conjunction with a rimless or wireframe eyewear is that the wearer may obtain a benefit of improved visual acuity that results from viewing the object through both the corrective lens (320) of FIG. 3A and the pinhole apertures of FIG. 3B simultaneously.

In one embodiment, the plurality of pinhole apertures (355) may be of a single diameter. In another embodiment, the plurality of pinhole apertures (355) may be of diameters of different sizes. In this latter embodiment, the pinhole apertures (355) may be provided in accordance with a size gradient, with the smaller diameters at the bottom of the opaque lenses (325) and the larger diameters at the top of the opaque lenses (325). In a preferred embodiment, the opaque lenses (325) is constructed of thin material having a thickness no greater than 2 mm, preferably no greater than 1 mm, and more preferably no greater than 0.5 mm.

FIGS. 1-3 depict the apertures as having a round shape. An advantage of having a round aperture is that it minimizes any higher-order diffraction effects. It is understood, however, that although FIGS. 1-3 depict round apertures, the apertures may also be configured in any shape, so long as that apertures are dimensioned to at least partially block out the peripheral light rays from entering into the eyes. Thus, the apertures may be characterized in accordance by its shape, diameter (d), and thickness (t). In the context of the apertures, the diameter (d) is defined as the largest distance that can be formed between two opposite points in the aperture shape.

FIGS. 4A-F provide examples of aperture shapes that may be suitable for use in connection with the present invention. The apertures in FIGS. 4A-F are each characterized by a diameter (d) which is the largest distance that can be formed between two opposite points in the aperture shape. In most instances, the diameter may be measured directly or calculated based on at least one known variable.

Figure 4A:
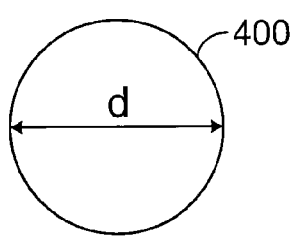
FIGS. 4A-F is a plan view of various exemplary aperture shapes that may be used in with various embodiments.
Figure 4B:
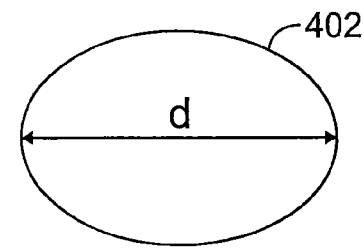

FIGS. 4A-B illustrate a circular aperture (400) and an elliptical aperture (402), respectively. As can be seen in these figures, the diameter (d) of the apertures define the largest distance and passes through the center of the apertures.

Figure 4C:
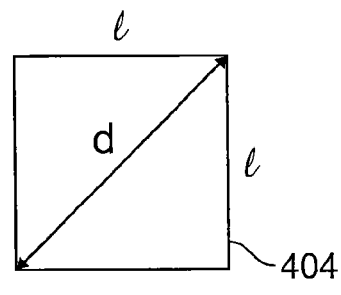
Figure 4D:
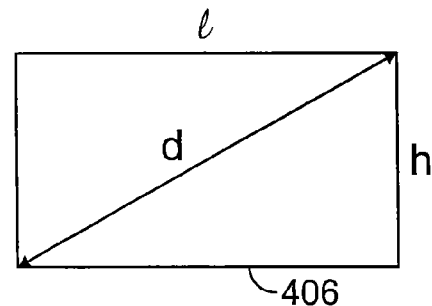

FIGS. 4C-D illustrate a square aperture (404) and a rectangular aperture (406), respectively. In these apertures, the diameter (d) is defined as the distance between any one of the two opposing corners. For the square aperture in FIG. 4C, the diameter d may be calculated based on the length of the two sides: $d=\sqrt{2l^2}$. For the rectangular aperture in FIG. 4D, the diameter d may be calculated based on the length and height of the figure: $d=\sqrt{l^2+h^2}$.

Figure 4E:
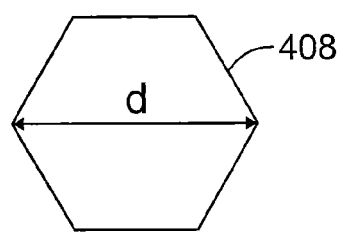

FIG. 4E illustrate a hexagonal aperture (408) having a diameter (d). Because calculating the diameter (d) becomes more difficult with polygons having more than four sides, direct measurement of the diameter (d) is preferred.

Figure 4F:
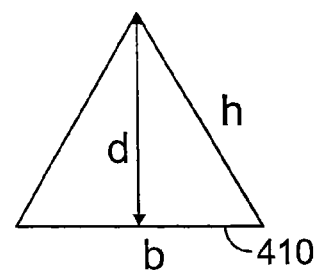

FIG. 4F illustrates a triangular aperture (410) having a diameter (d). In the case of equilateral and isosceles triangles, the diameter (d) may be calculated as follows:

$$d = \sqrt{h^2 - \frac{b^2}{4}}.$$

The shape of the aperture is not critical, so long as the diameter (d) of the aperture is preferably no larger than about 2 mm. Generally, a smaller pinhole will result in better image resolution (sharper picture) as the projected circle of confusion is smaller at the image plane. An extremely small hole, however, can produce significant diffraction effects which will result in a less clear image. Thus, the diameter (d) should preferably be no greater than about 3 mm, preferably no greater than 2 mm, and more preferably no greater than 1 mm. In one aspect of the invention, the apertures or pinhole apertures have a diameter ranging from about 0.3 mm to about 2 mm, preferably about 0.5 mm to about 1.5 mm, and more preferably from about 0.8 mm to about 1.2 mm.

Alternatively, the pinhole diameter may be provided by taking into account the focal length and the wavelength of light. One method of calculating the optimal pinhole diameter is: $d=1.91\sqrt{f\lambda}$, where d is diameter, f is focus length (distance from hole to the retina) and λ is the wavelength of light. For example, for a pinhole to retina distance of 1 inch, the pinhole diameter will be 0.22 mm for a wavelength of light corresponding to yellow-green (550 nm), and for a pinhole to retina distance of 5 cm, the pinhole diameter will be 0.32 mm for the same wavelength of light.

Figure 5:
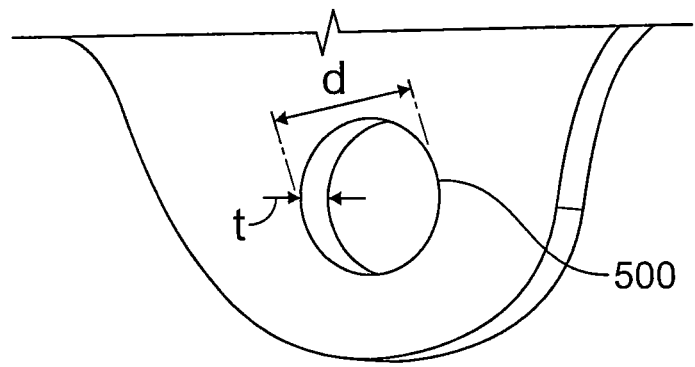
FIG. 5 is a close-up perspective view of a round aperture showing an exemplary relationship between the diameter (d) and thickness (t) of an aperture made in a relatively thin material.

In addition to the aperture shape and diameter, apertures are also generally characterized by a thickness (t), as shown in FIG. 5. The thickness (t) of the aperture (500) affects the amount of light that enters through the aperture and into the subject's eyes. As the diameter (d) of the aperture approaches the a thickness (t) of the material in which the aperture is provided, significant vignetting at the edges of the image will result, as less light will reach these areas. This is due to the shading effect of the sides of the hole for light coming in at other than a 90° angle. Thus, the aperture should be formed in as thin a material as possible. The thickness (t) should preferably be no greater than the diameter (d) of the aperture or pinhole aperture. In one aspect, the ratio of the aperture diameter to thickness (d:t) should be no less than about 1:1.5 (66.7%), preferably greater than 1:1, and more preferably greater than 2:1. Generally, the thinner the aperture, the better the visual acuity and light provided by the aperture to the eye, so long as the aperture is made in an opaque material.

Figure 6:
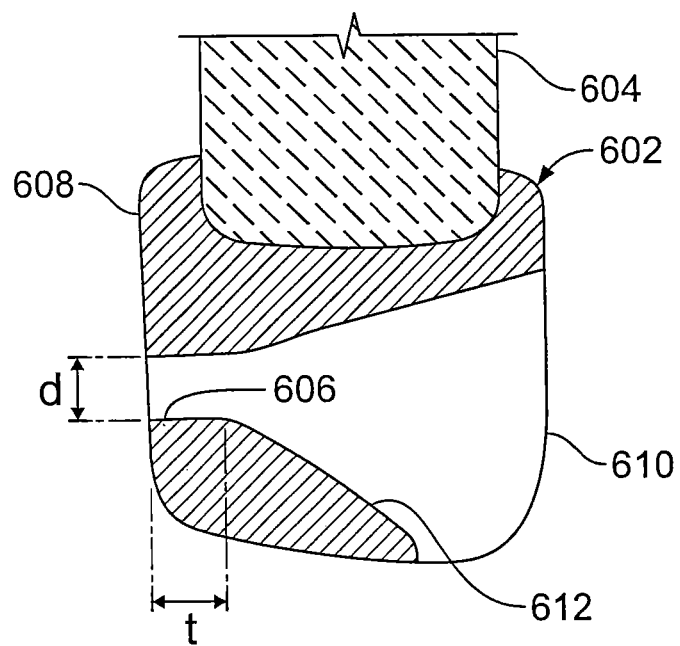
FIG. 6 is a close-up cross-sectional view showing an exemplary pinhole aperture made in a relatively thick material.

In some embodiments, it may be desirable to pierce a relatively thick material with a pinhole aperture. For example, a pinhole aperture may be placed through a relatively thick eyeglass frame as shown in FIGS. 1A-C. In such cases, it may be desirable to provide a localized thinning or opening of the frame in an area around the aperture, to maximize the aperature's effective diameter/thickness ratio. FIG. 6 shows an enlarged view, partial cross-section through a frame member (602) that is supporting a lens (604). A pinhole aperture 606 is provided through a front surface 608 of the frame member. Surface 608 is disposed away from the wearer's face (not shown) while surface 610 faces the wearer's face. A recess 612 may be provided in surface 608. Pinhole aperture 606 may pass from a bottom of the recess 612 through to the front surface 608. In this way, the ratio (d/t) may be maintained in a desired range.

The invention described and claimed herein is not to be limited in scope by the specific preferred embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims

What is claimed is:

1. An optical device comprising:
a first vision element comprising at least one lens; and
a generally opaque frame member defining a second vision element and supporting the first vision element, the second vision element comprising at least one aperture through an opaque portion of the frame member and having a maximum diameter (d) not greater than about 3 mm extending through a thickness (t) of the frame member, wherein d:t is not less than 1:1.5;
wherein the second vision element comprises a pinhole aperture for at least partially correcting a refraction error of a user's eyes.

2. The optical device of claim 1, wherein the first vision element at least partially reduces the refraction error of the user's eyes by bending some of the light rays entering through the at least one lens and into the user's eyes.

3. The optical device of claim 1, wherein the second vision element at least partially reduces the refraction error of the user's eyes by blocking some of the light rays which would otherwise enter into the periphery of the user's eyes.

4. The optical device of claim 3, wherein the second vision element comprises two apertures.

5. The optical device of claim 4, wherein the two apertures are separated by a distance that is approximately equal to the distance between the pupils of the user's eyes.

6. The optical device of claim 3, wherein the second vision element comprises a plurality of apertures.

7. The optical device of claim 6, wherein the plurality of apertures have diameters (d) which are roughly uniform.

8. The optical device of claim 6, wherein the plurality of apertures are provided along a gradient of increasing diameters (d).

9. The optical device of claim 1, wherein the first and second vision elements are both arranged in front of the user's eyes such that the user looks through both the first and second vision elements simultaneously.

10. The optical device of claim 1, wherein the at least one aperture is shaped in one or a combination of shapes selected from the group consisting of: a circle, an oval, triangle, a square, a rectangle, and a polygon.

11. The optical device of claim 1, wherein the at least one aperture has a diameter (d) no greater than 1 mm.

12. The optical device of claim 11, wherein the d:t ratio is greater than 2:1.

13. The optical device of claim 1, wherein the frame is locally thinned in a surrounding area where the aperture is placed.

14. The optical device of claim 1, wherein the aperture is disposed in a recess of the frame member.

15. A corrective eyewear comprising:
at least one lens;
a frame supporting the lens; and
at least one pinhole aperture passing through an opaque portion of the frame and configured as a vision-enhancing feature, the at least one pinhole aperture having a maximum diameter (d) not greater than about 3 mm and a thickness (t), wherein the thickness (t) is no greater than the diameter (d).

16. The corrective eyewear of claim 15, wherein the frame comprises a frame front.

17. The corrective eyewear of claim 16, wherein at least two pinhole apertures are disposed in the frame front.

18. The corrective eyewear of claim 17 comprising a plurality of pinhole apertures, wherein the pinhole apertures surround the at least one lens.

19. The corrective eyewear of claim 15, wherein the at least one aperture has a diameter (d) no greater than 1 mm.

20. The corrective eyewear of claim 19, wherein a ratio of d:t for the at least one pinhole aperture is greater than 2:1.

* * * * *